(12) United States Patent
Fa-Kouri

(10) Patent No.: US 7,901,168 B2
(45) Date of Patent: Mar. 8, 2011

(54) CARGO ANCHORING SYSTEM

(76) Inventor: David C. Fa-Kouri, Baton Rouge, LA (US)

( * ) Notice: Subject to any disclaimer, the term of this patent is extended or adjusted under 35 U.S.C. 154(b) by 692 days.

(21) Appl. No.: 11/911,071

(22) PCT Filed: Apr. 11, 2006

(86) PCT No.: PCT/US2006/013325
§ 371 (c)(1),
(2), (4) Date: Oct. 9, 2007

(87) PCT Pub. No.: WO2006/110657
PCT Pub. Date: Oct. 19, 2006

(65) Prior Publication Data
US 2008/0206010 A1    Aug. 28, 2008

Related U.S. Application Data

(60) Provisional application No. 60/669,982, filed on Apr. 11, 2005.

(51) Int. Cl.
*B60P 7/08* (2006.01)
(52) U.S. Cl. .................... 410/23; 410/4; 410/12; 410/97
(58) Field of Classification Search .................. 410/3, 4, 410/7, 9, 10, 11, 12, 23, 97, 100; 24/302; 224/403, 534, 568; 248/499
See application file for complete search history.

(56) References Cited

U.S. PATENT DOCUMENTS

| | | | |
|---|---|---|---|
| 5,941,665 A | 8/1999 | Dahlin | |
| 6,135,685 A | 10/2000 | Anthony et al. | |
| 6,231,285 B1 | 5/2001 | Elwell et al. | |
| 6,524,041 B1 | 2/2003 | Voiculescu | |
| 6,637,077 B2 | 10/2003 | Doty | |
| 7,322,780 B2 * | 1/2008 | Hill | 410/97 |

* cited by examiner

*Primary Examiner* — Stephen Gordon
(74) *Attorney, Agent, or Firm* — McGlinchey Stafford, PLLC; R. Andrew Patty, II

(57) ABSTRACT

This invention provides a cargo anchoring system for anchoring cargo to a cargo bed. One cargo anchoring system comprises a rear ring; a forward ring; and a ring connection member connecting the rear ring to the forward ring. A first lateral ring is sized and configured to be directly or indirectly attached to the cargo bed, a first lateral connection member connects the first lateral ring and the rear ring, and a second lateral ring is sized and configured to be directly or indirectly attached to the cargo bed, a second lateral connection member connecting the second lateral ring and the rear ring. A first elongate connection member is attached to the first lateral ring, and a second elongate connection member is attached to the second lateral ring. A front ring is sized and configured to be directly or indirectly attached to an item of cargo. Both elongate connection members are threaded through the forward ring and attached to the front ring. The cargo anchoring system further comprises either a hitch strap or a winch strap sized and configured to connect the rear ring to an item of cargo.

16 Claims, 5 Drawing Sheets

CARGO ANCHORING SYSTEM

This is the National Stage of International Patent Application No. PCT/US06/013325 filed Apr. 11, 2006, which International Patent Application claims the priority of US Provisional Application No. 60/669,982 filed on Apr. 11, 2005.

FIELD OF THE INVENTION

The present invention relates to devices and methods for anchoring cargo to trailers, truck beds and similar mobile cargo holds.

BACKGROUND

Certain types of cargo present transportation issues, especially when the cargo is large relative to the cargo hold in which the cargo is placed and when the cargo hold is being used to transport the cargo from one place to another. Obvious safety issues are presented when cargo is being transported in open truck beds, open trailers and the like. The increased popularity of all-terrain vehicles and similar types of weighty, wheeled cargo has also caused an increase in the risk associated with transportation of such cargo in open truck beds and trailers.

Previous anchoring systems for such cargo typically have involved the use of straps or chains. However, these systems have lacked sufficient adjustability to enable their use across a wide variety of cargo sizes and trailer sizes, sometimes have failed to anchor cargo both vertically and laterally, and have typically involved few safety features to ensure that the cargo stays in place even in the event of partial anchor failure.

A need therefore continues to exist for effective, adjustable cargo anchoring systems which are easy to use.

THE INVENTION

The present invention meets this need, amongst others, by providing an anchoring system which can be adjusted for use in truck beds, trailers and the like with varying dimensions to secure all-terrain vehicles and other cargo at as few as two points of attachment on the cargo. The system is easy to install and adjust, and can prevent cargo movement both in a vertical direction and a lateral direction relative to the bed or trailer.

One embodiment of this invention is a cargo strap system for anchoring cargo to a cargo bed. The cargo strap system comprises a rear ring; a forward ring; and a ring connection member connecting the rear ring to the forward ring. A first lateral ring is sized and configured to be directly or indirectly attached to the cargo bed, a first lateral strap connecting the first lateral ring and the rear ring; and a second lateral ring is sized and configured to be directly or indirectly attached to the cargo bed, a second lateral strap connecting the second lateral ring and the rear ring. A first elongate strap is attached to the first lateral ring, and a second elongate strap attached to the second lateral ring. A front ring is sized and configured to be directly or indirectly attached to an item of cargo. Both elongate straps are threaded through the forward ring and attached to the front ring. The cargo system further comprises either a hitch strap or a winch strap sized and configured to connect the rear ring to an item of cargo.

Another embodiment of this invention is a method for securing cargo to an open cargo bed or trailer. The method comprises placing the cargo on the open cargo bed or trailer, attaching a winch strap or a first hitch strap to a rear portion of the cargo; attaching the winch strap or first hitch strap to a rear ring; connecting the rear ring to a forward ring with a ring connection member; attaching a first lateral strap and a second lateral strap to the rear ring; attaching the first lateral strap to a first lateral ring; attaching the second lateral strap to a second lateral ring; attaching a first elongate strap to the first lateral ring; attaching a second elongate strap to the second lateral ring; threading both elongate straps through the forward ring; attaching both elongate straps to a front ring. At least one of the following steps is performed: a) moving the cargo toward the rear of the bed or trailer so that the winch strap or first hitch strap is made taut; b) attaching a second hitch strap to a front portion of the cargo; attaching the second hitch strap to a front ring; adjusting the second hitch strap into a taut position. The straps are tightened.

Still another embodiment of this invention is a method for securing cargo to an open cargo bed or trailer. The method comprises placing the cargo on the open cargo bed or trailer, attaching a cargo strap system of the invention to the cargo; and tightening the straps of the system.

The various embodiments and features of this invention will now become apparent from the following detailed description, the accompanying drawings and the appended claims.

SUMMARY OF THE FIGURES

Like numbers and/or letters in the various figures are used to refer to like parts or components within the group of figures.

DETAILED DESCRIPTION OF THE INVENTION

As will now be appreciated, the present invention provides an adjustable strap or lanyard system which enables an easy and extremely secure attachment of all-terrain vehicles and similar cargo to an open trailer or truck bed or similar cargo hauler, using either a winch attached to the cargo itself or a winch strap component within the strap system. The cargo can be something other than an all-terrain vehicle, but generally the system of the invention is suitable for securing three-wheeled vehicles and four-wheeled vehicles on open cargo beds or trailers.

Figure 1:
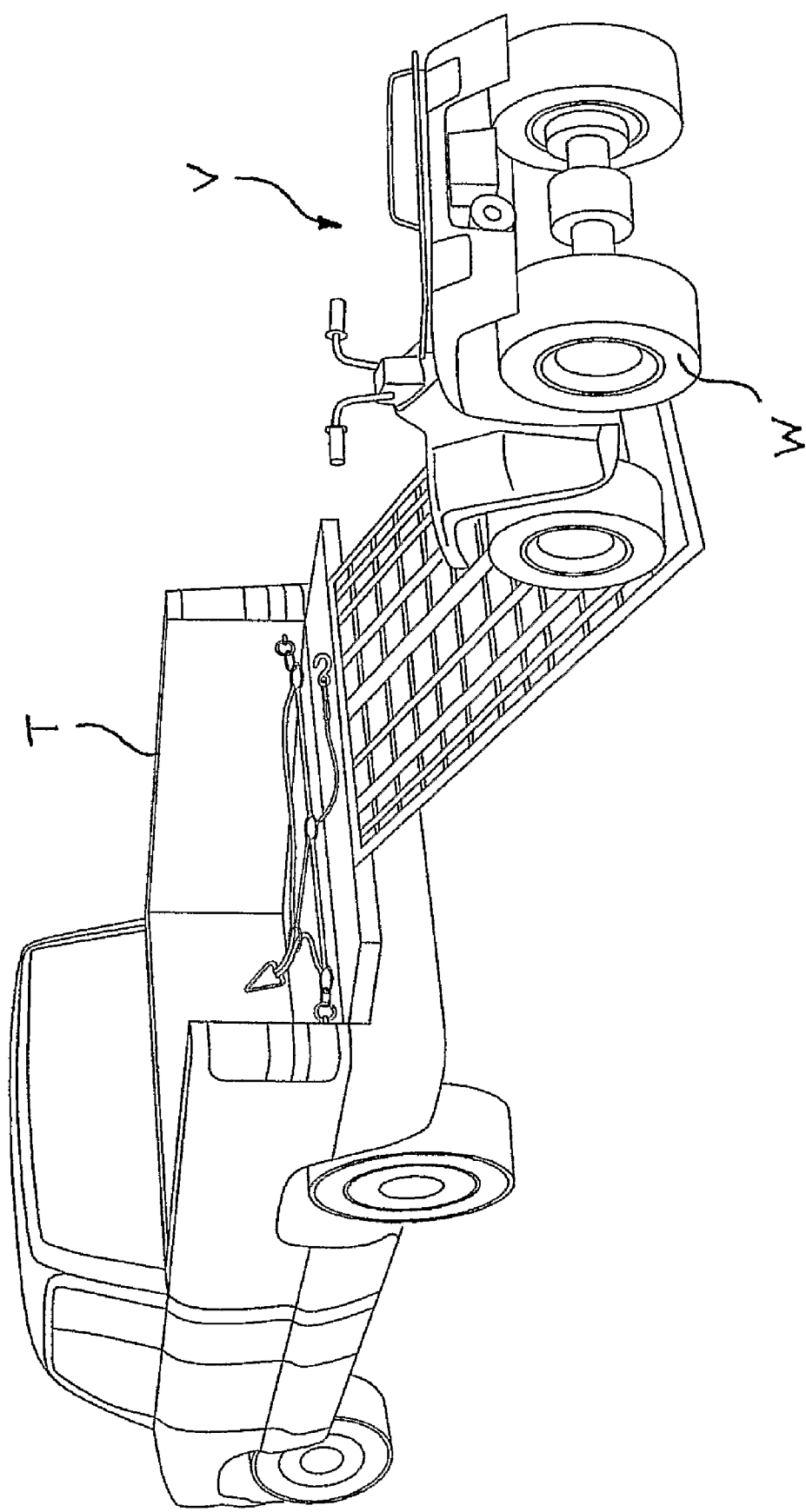
FIG. 1 is an elevated view in perspective of one embodiment of this invention lying in an open truck bed showing an all-terrain vehicle in preparation for loading onto the truck bed.
Figure 2:
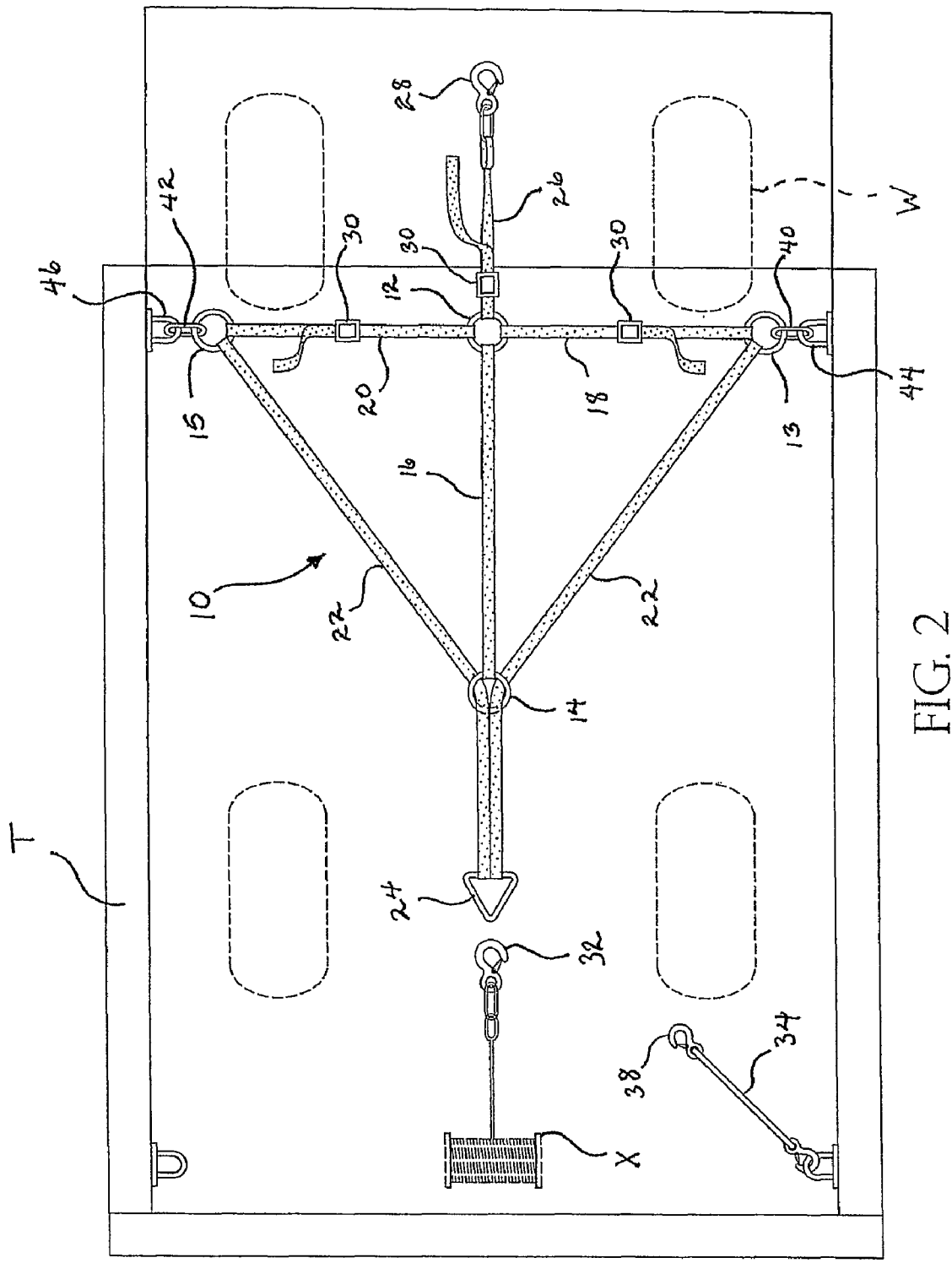
FIG. 2 is top plan view of the truck bed in FIG. 1, in which another embodiment of the invention is disposed and the tires of an all-terrain vehicle on the truck bed are shown in phantom view.

Referring now to the accompanying figures, FIG. 1 illustrates an all-terrain vehicle V poised to be loaded into a truck bed T. A cargo lanyard system 10 of this invention is disposed on the floor of bed T. FIG. 2 illustrates another view of system 10. System 10 includes a rear ring 12, a forward ring 14, two lateral rings 13 and 15, a ring connection member 16, two opposing lateral straps 18 and 20, two elongate straps 22, 22, both of which are threaded through forward ring 14, a triangular front ring 24 near the forward end of bed T, a hitch strap 26 and a lobster claw hook 28. The length of each of straps 18, 20 and 26 is adjustable because each of those particular straps includes an intermediate cam buckle 30 connecting two respective parts of the strap. As may be seen in FIG. 2, the location of the all-terrain vehicle when loaded in the illustrated truck bed T is represented by the outline of the tires W of vehicle V. As depicted, bed T is not long enough to contain the particular vehicle V without the tailgate being in an open position, but this can vary depending upon the size of the truck bed and the size of the all-terrain vehicle.

FIG. 2 further illustrates a winch X (not shown in FIG. 1) attached to the truck bed T, the free end of winch X being configured for detachable attachment to front ring 24 by way of another lobster claw hook 32. A safety harness 34 extends from a fixed loop 36 extending from bed T. Safety harness 34 is itself configured for detachable attachment to the vehicle V using a lobster claw hook 38. Harness 34 serves to ensure that, in the event of unforeseen failure by system 10 or a severe overturn of the truck itself, a backup attachment of the cargo to the truck bed T will keep the cargo anchored to bed T to help prevent vehicle V from leaving bed T.

In FIG. 2 it will also be noted that attachment means in the form of threaded, removable links 40 and 42 have been employed to attach lateral rings 13 and 15 to bed T at respective anchored loops 44 and 46. In use, system 10 can be configured to operate using different types of winch configurations. The configuration depicted in FIGS. 1 and 2 is one in which the winch X is provided at the front wall of bed T (see FIG. 2). When such a winch is provided, system 10 is ideally configured as shown in FIGS. 1 and 2, so that vehicle V is first driven into or otherwise placed in bed T to a point where hitch strap 26 may be attached to a rear hitch or other frame member of vehicle V using hook 28 and lateral rings 13 and 15 are detachably attached to anchored loops 44 and 46. Ideally, lateral straps 18 and 20 are also adjusted to be placed in a taut position to reduce lateral play in those straps. Once these connections are made, vehicle V is then moved toward the rear of bed T until hitch strap 26 is taut. Then, winch X is attached to a front frame member of vehicle V and the winch is actuated to place elongate straps 22,22 in a taut position until vehicle V is secured to bed T so as to prevent measurable lateral, forward or rearward movement.

Referring again to FIG. 2, in an alternative configuration, hitch strap 26 may be threaded through forward ring 14 and then through rear ring 12 before being attached to the vehicle V. This configuration confers even greater stability, which is an advantage for wider cargo beds.

Figure 3:
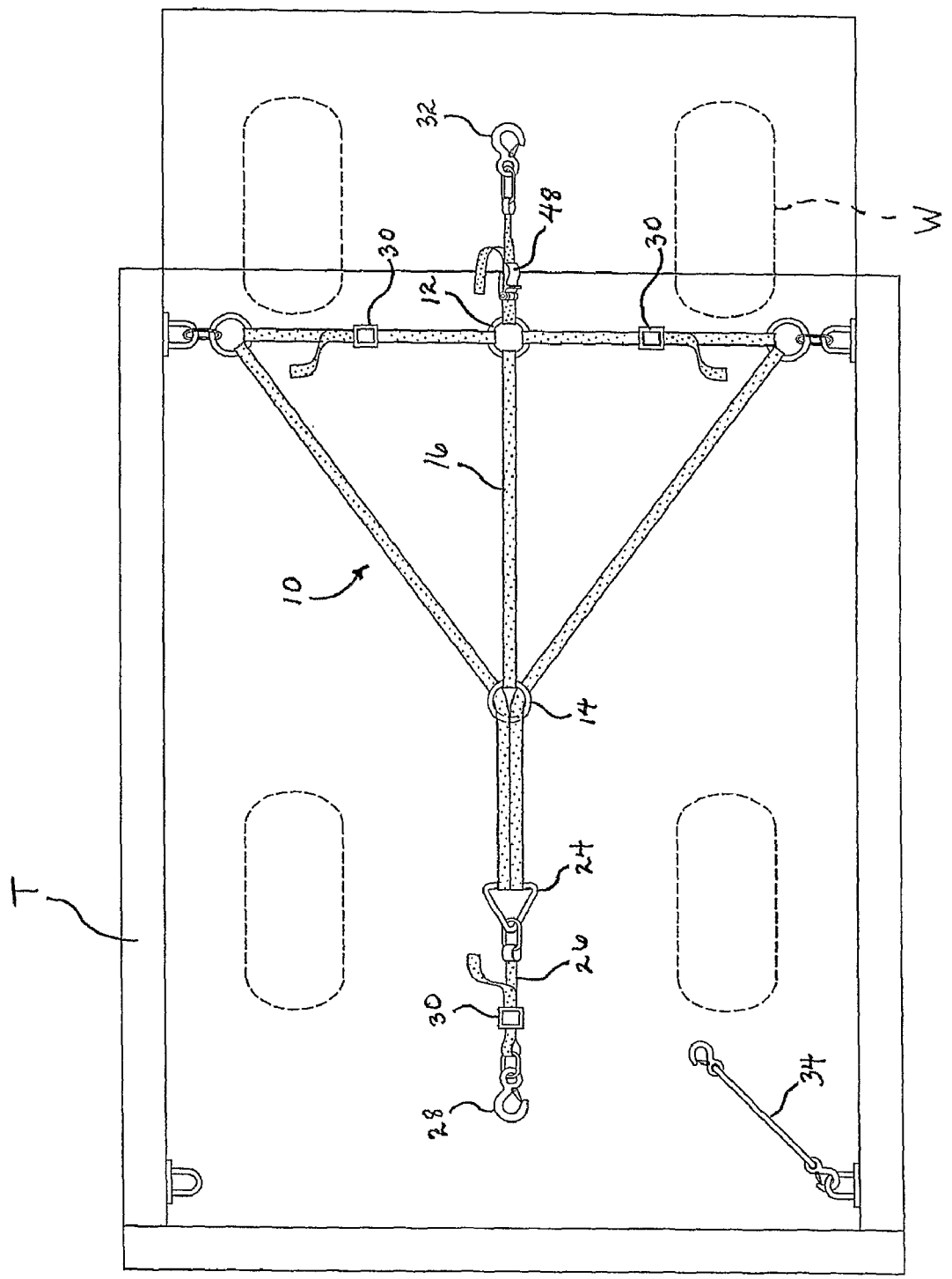
FIG. 3 is a top plan view of the truck bed in FIG. 1 in which another embodiment of the invention is disposed and the tires of an all-terrain vehicle on the truck bed are shown in phantom view.

In an alternative configuration as illustrated in FIG. 3, there is no winch attached to bed T. Instead, a winch strap 48 replaces hitch strap 26 of FIG. 2, and hitch strap 26 and hook 28 are attached to front ring 24 as shown. To use system 10 under this configuration, preferably vehicle V is loaded onto bed T and pulled as far forward as possible. Once in that position, hook 28 may be attached to a front portion or frame member of vehicle V and strap 26 adjusted into a taut position. Thereafter, hook 32 is attached to a rear portion or frame member of vehicle V and the winch or hitch strap 26 is actuated to place hitch strap 26 and the rest of the straps of system 10 into taut position to secure vehicle V to bed T.

Figure 5:
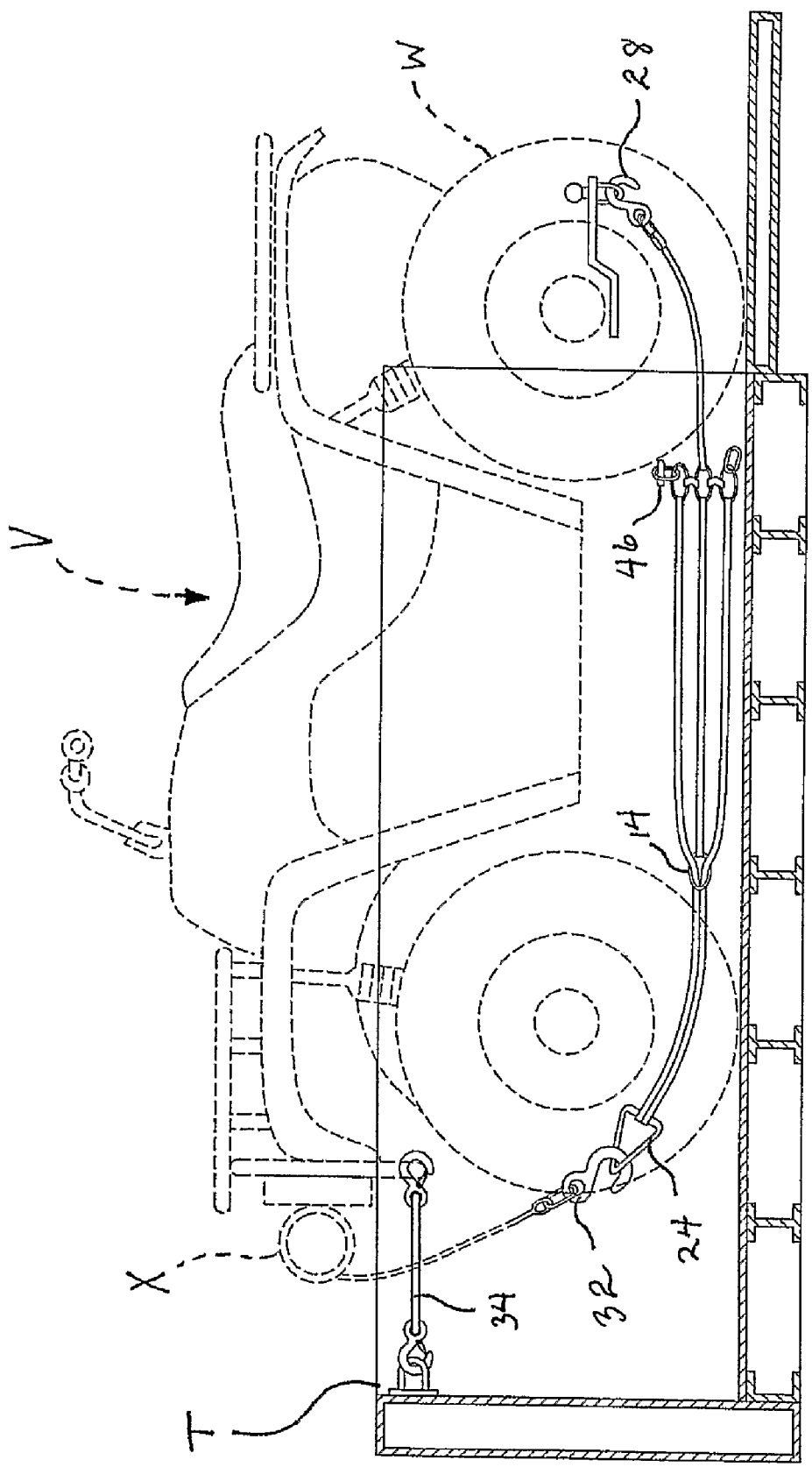
FIG. 5 is a cross-sectional side view of the truck bed of FIG. 1 loaded with an all-terrain vehicle shown in phantom view and shown attached to one embodiment of this invention.

In yet another alternative configuration as illustrated in FIG. 5, a winch is attached to a front portion of vehicle V. In essence, this configuration is installed and operated in much the same way as the configuration for FIG. 2, except that the winch employed is attached to vehicle V rather than bed T. As depicted, hitch strap 26 in FIG. 5 is not length adjustable; however, an adjustable length strap may be used here as well.

Figure 4:
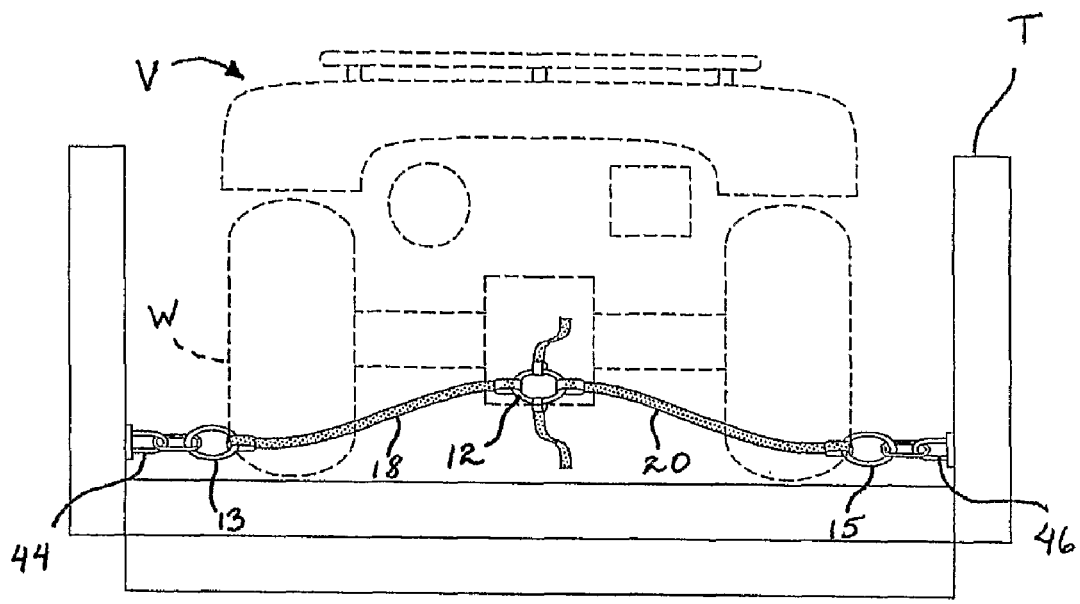
FIG. 4 is a rear view of the truck bed in FIG. 1 in which an all-terrain vehicle has been stowed and to which the all-terrain vehicle has been attached by a device of the invention, the device being partially broken away.

When the various straps of systems of this invention are winched into a taut position, it should be appreciated from FIG. 4 that anchored loops 44 and 46 are preferably disposed at a lower portion of the respective side walls of bed T, so that the tightening of the straps of system 10 produces a downward pull or force at the point where the system is connected at a rear portion of vehicle V, so as to produce added vertical restraint of the cargo. Without being bound to theory, it is believed that this positioning of the bed loops, coupled with the threading of elongate straps 22,22 through ring 14 and the connection of the system to the front and rear portions of vehicle V, create an interaction of forces which effectively anchor vehicle V to bed T.

Figure 6:
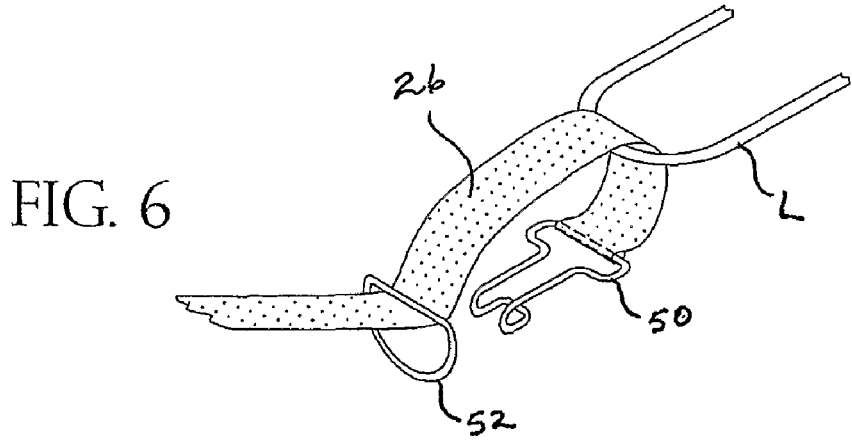
FIG. 6 is an elevated, perspective view of a broken away portion of an embodiment of this invention employing a detachable loop hook.

In some embodiments of the invention, the hooks employed may be replaced by a loop hook as illustrated in FIG. 6. There it can be seen that an end of a strap member, for example an end of hitch strap 26, may be configured to be attached to a loop hook 50, and threaded through a D-ring 52, so that when loop hook 50 threaded through an anchor loop L or similar structure on vehicle V, is then hooked to D-ring 52 and hitch strap 26 is pulled taut, a secure connection is made between the strap 26 and loop L, and that connection is less likely to disconnect involuntarily when strap 26 is slackened.

Figure 6A:
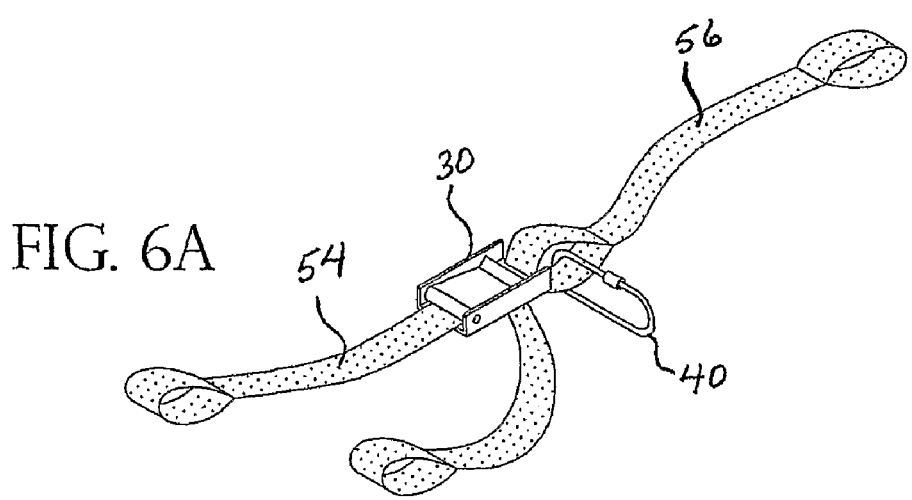
FIG. 6A is an elevated, perspective view of an adjustable strap component of an embodiment of this invention.

In other embodiments of the invention, an extension strap member may be employed to maximize the adjustability of the length of a given strap. Thus, as illustrated in FIG. 6A, a first strap portion 54 may be threaded through a cam buckle 30, and a second strap portion 56 may be fixedly attached to cam buckle 30 and provided with a threaded, removable link 40 or similar attachment means for attaching portion 54 or portion 56 to a ring component of the invention or to a hook for attachment to vehicle V.

In the above Figures, triangular ring 24 is a preferred embodiment of the front ring. The front ring can be of various shapes, including circular, square, and triangular, with a triangular shape being preferred. The front ring can be of various shapes, so long as the part to which the elongate straps are attached is flat. Thus, the front ring can have various shapes, including square, D-ring, and triangular, with a triangular shape being preferred.

Referring again to the above description of the Figures, one of the two lateral rings 13 and 15 is the first lateral ring while the other is the second lateral ring, and one of the two opposing lateral straps 18 and 20 is the first lateral strap while the other is the second lateral strap. For example, if lateral ring 13 is the first lateral ring, lateral strap 18 is the first lateral strap, lateral ring 15 is the second lateral ring, and lateral strap 20 is the second lateral strap.

To ensure maximum flexibility, it should be understood that all of the component hooks and links in devices of the invention are preferably detachably attachable to those items to which they are described as being attached. The lateral straps, hitch strap, and winch strap can be adjustable. Of course, the straps and other components employed in the systems of this invention should be fabricated from material with sufficient strength to withstand the loads of the cargo to be hauled. Examples of suitable strap material for hauling all-terrain vehicles, for example, might include woven polypropylene straps, nylon straps or similar woven strap material. Moreover, those of skill in the art will appreciate that other connection members, besides or in addition to straps, may be employed with effectiveness in embodiments of the invention. Thus, for example, cable, chain, rope, coiled springs and the like, could conceivably be substituted for, or used to supplement, the straps illustrated with particularity above. When described herein as adjustable, such connection members or straps are considered adjustable in length either through an intermediate device (e.g., a cam buckle) or through the use of a winch or other similar leverage mechanism capable of shortening the distance between the connected components or objects. Effective length is the length of the connection member measured between the points or objects being connected, not including additional member length which may extend beyond the distance between those points or objects. Effective length is considered adjusted, for example, through the use of a winch or cam buckle, wherein additional length of a member is removed, e.g., through leverage, to shorten the effective length of the connection member.

The present illustrations of certain embodiments of this invention and descriptions thereof employ the use of terms such as rear, rear portion, forward and forward portions for ease of description. However, it should be appreciated that systems of this invention may be employed so that what is described herein as "foward" is actually rear, and what is described here as "rear" is actually forward, in the particular circumstances of application. All such applications and configurations fall within the scope of the invention. In similar fashion, while the particular illustrations shown associate the rear portion of cargo with the "rear" elements of the system of the invention depicted, this need not always be the case, as the system may be inverted as compared to the installations illustrated here, and installed so that the "forward" of "front" potions or components connect to or are proximate with what might be considered the rear portion of the cargo, and vice versa.

The present invention shall not be limited to the particular embodiments illustrated herein, but instead shall include all equivalents thereof permitted as a matter of law.

The invention claimed is:

1. A cargo anchoring system for anchoring cargo to a cargo bed, the system comprising
    a rear ring;
    a forward ring;
    a ring connection member connecting the rear ring to the forward ring;
    a first lateral ring sized and configured to be directly or indirectly attached to the cargo bed;
    a first lateral connection member connecting the first lateral ring and the rear ring;
    a second lateral ring sized and configured to be directly or indirectly attached to the cargo bed;
    a second lateral connection member connecting the second lateral ring and the rear ring;
    a first elongate connection member attached to the first lateral ring;
    a second elongate connection member attached to the second lateral ring; and
    a front ring sized and configured to be directly or indirectly attached to an item of cargo;
    wherein both elongate connection members are threaded through the forward ring and attached to the front ring, and further comprising a first cargo connection member which is adjustable in connection length and which is sized and configured to connect either the front ring or the rear ring to the item of cargo and when installed to remove slack from the system when its length is sufficiently shortened, and further comprising a second cargo connection member for connecting the other one of either the front ring or the rear ring to which the first cargo connection member is not attached.

2. A system as in claim 1 wherein the system is at least further characterized by at least one of the following characteristics:
    at least one of the lateral connection members is adjustable in length; and
    the front ring is triangular in shape.

3. A system as in claim 1 where the system is at least further characterized by one of the following characteristics:
    the second cargo connection member comprises a hitch strap configured for attachment to the rear ring; or
    the first cargo connection member comprises a winch strap configured for attachment to the rear ring, and the second cargo connection member comprises a hitch strap configured for attachment to the front ring.

4. A system as in claim 3 wherein the hitch strap is adjustable in length, and wherein the system further comprises a hook attached to one end of the hitch strap.

5. A system as in claim 3 wherein the winch strap is adjustable in length, and wherein the system further comprises a hook attached to one end of the winch strap.

6. A system as in claim 1 wherein at least one of the lateral connection members is adjustable in length, wherein a hitch strap is attached to the rear ring, wherein the hitch strap is adjustable in length, and wherein the front ring is triangular in shape.

7. A system as in claim 1 wherein at least one of the lateral connection members is adjustable in length, wherein a hitch strap is attached to the front ring and a winch strap is attached to the rear ring, wherein the hitch strap is adjustable in length, wherein the winch strap is adjustable in length, and wherein the front ring is triangular in shape.

8. A system as in claim 1 wherein the second cargo connection member comprises a hitch strap configured for attachment to the front ring, wherein the hitch strap is adjustable in length, and where the system further comprises a hook attached to one end of the hitch strap.

9. A system as in claim 1 further comprising a first anchored loop detachably attached to the first lateral ring and a second anchored loop detachably attached to the second lateral ring.

10. A system as in claim 1 further comprising a first removable link detachably attached to the first lateral ring and a second removable link detachably attached to the second lateral ring, and a first anchored loop detachably attached to the first removable link and a second anchored loop detachably attached to the second removable link, wherein the anchored loops are sized and configured for attachment to a cargo bed or trailer.

11. A system as in claim 1 further comprising a safety harness sized and configured for attachment to a fixed loop of a cargo bed or trailer.

12. A system as in claim 1 further comprising a winch, wherein the winch is either attached to the item of cargo bed or attached to the cargo itself.

13. A method for securing cargo to an open cargo bed or trailer, which method comprises
    placing the cargo on the open cargo bed or trailer;
    attaching a cargo anchoring system according to claim 1 to the cargo and the cargo bed or trailer; and
    adjusting an effective length of one or more of the connection members of the cargo anchoring system, to thereby secure the cargo to the cargo bed or trailer.

14. A method for securing cargo to an open cargo bed or trailer, which method comprises placing the cargo on the open cargo bed or trailer;

attaching a cargo anchoring system according to claim 3 to the cargo and the cargo bed or trailer; and adjusting an effective length of one or more of the connection members of the cargo anchoring system, to thereby secure the cargo to the cargo bed or trailer.

15. A method for securing cargo to an open cargo bed or trailer, which method comprises placing the cargo on the open cargo bed or trailer;

attaching a cargo anchoring system according to claim 4 to the cargo and the cargo bed or trailer; and adjusting an effective length of one or more of the connection members of the cargo anchoring system, to thereby secure the cargo to the cargo bed or trailer.

16. A method for securing cargo to an open cargo bed or trailer, which method comprises placing the cargo on the open cargo bed or trailer;

attaching a cargo anchoring system according to claim 5 to the cargo and the cargo bed or trailer; and adjusting an effective length of one or more of the connection members of the cargo anchoring system, to thereby secure the cargo to the cargo bed or trailer.

* * * * *